United States Patent
Zhang et al.

(10) Patent No.: US 12,350,914 B2
(45) Date of Patent: Jul. 8, 2025

(54) SCROLL-TYPE DISPLAY PANEL AND SCROLL-TYPE DISPLAY DEVICE

(71) Applicant: BOE TECHNOLOGY GROUP CO., LTD., Beijing (CN)

(72) Inventors: Jiahao Zhang, Beijing (CN); Penghao Gu, Beijing (CN); Shuang Du, Beijing (CN); Paoming Tsai, Beijing (CN); Hong Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 500 days.

(21) Appl. No.: 17/763,392

(22) PCT Filed: May 25, 2021

(86) PCT No.: PCT/CN2021/095847
§ 371 (c)(1),
(2) Date: Mar. 24, 2022

(87) PCT Pub. No.: WO2021/238930
PCT Pub. Date: Dec. 2, 2021

(65) Prior Publication Data
US 2022/0369483 A1    Nov. 17, 2022

(30) Foreign Application Priority Data
May 27, 2020   (CN) .......................... 202010462755.9

(51) Int. Cl.
*B32B 3/12* (2006.01)
*G06F 1/16* (2006.01)
*G09F 9/30* (2006.01)

(52) U.S. Cl.
CPC .............. *B32B 3/12* (2013.01); *G06F 1/1652* (2013.01); *G09F 9/301* (2013.01); *B32B 2457/20* (2013.01)

(58) Field of Classification Search
CPC .............................. G09F 9/301; G06F 1/1652
See application file for complete search history.

(56) References Cited

U.S. PATENT DOCUMENTS

| 9,244,494 B2 | 1/2016 | Hinson |
| 9,298,297 B2 | 3/2016 | Kim et al. |

(Continued)

FOREIGN PATENT DOCUMENTS

| CN | 110010013 A | 7/2019 |
| CN | 110288914 A | 9/2019 |

(Continued)

OTHER PUBLICATIONS

International Search Report from PCT/CN2021/095847 dated Aug. 31, 2021.

(Continued)

*Primary Examiner* — Mariceli Santiago
(74) *Attorney, Agent, or Firm* — Calfee, Halter & Griswold LLP

(57) ABSTRACT

A scroll-type display panel and a scroll-type display device. The scroll-type display panel comprises a display module; the display module comprises: a support layer and an array substrate; the support layer comprises a first wound portion and a second wound portion which are distributed in a winding direction; the array substrate is located on one side of the support layer, and an orthographic projection of the array substrate on the support layer is located on the first wound portion, wherein hollowed-out openings are provided on both the first wound portion and the second wound portion, and the area ratio of the hollowed-out openings to the first wound portion is greater than the area ratio of the hollowed-out openings to the second wound portion.

18 Claims, 3 Drawing Sheets

(56) References Cited

U.S. PATENT DOCUMENTS

| | | | |
|---|---|---|---|
| 10,602,623 | B1 | 3/2020 | Myers |
| 10,789,863 | B2 | 9/2020 | Song |
| 2014/0009419 | A1 | 1/2014 | Kim et al. |
| 2014/0362512 | A1 | 12/2014 | Hinson |
| 2018/0095551 | A1 | 4/2018 | Lindblad |
| 2020/0084897 | A1* | 3/2020 | Shin .................. H05K 5/0217 |
| 2020/0135065 | A1 | 4/2020 | Song |
| 2020/0152096 | A1 | 5/2020 | Jia |
| 2022/0225519 | A1* | 7/2022 | Seki .................. G09F 9/301 |

FOREIGN PATENT DOCUMENTS

| | | |
|---|---|---|
| CN | 209859506 U | 12/2019 |
| CN | 110649087 A | 1/2020 |
| CN | 110767096 A | 2/2020 |
| CN | 110895901 A | 3/2020 |
| CN | 110992837 A | 4/2020 |
| CN | 111091760 A | 5/2020 |
| CN | 111091762 A | 5/2020 |
| CN | 111489651 A | 8/2020 |
| CN | 110010013 B | 1/2021 |
| WO | 2014/1997769 A1 | 12/2014 |
| WO | 2020211588 A1 | 10/2020 |

OTHER PUBLICATIONS

Written Opinion from PCT/CN2021/095847 dated Aug. 31, 2021.
Office action from Chinese Application No. 202010462755.9 dated Jan. 21, 2022.
Office action from Chinese Application No. 202010462755.9 dated Jul. 2, 2021.
Allowance from Chinese Application No. 202010462755.9 dated Apr. 22, 2022.

* cited by examiner

SCROLL-TYPE DISPLAY PANEL AND SCROLL-TYPE DISPLAY DEVICE

CROSS-REFERENCE TO RELATED APPLICATIONS

The present application is the 371 application of PCT Application No. PCT/CN2021/095847, filed on May 25, 2021, which is based upon and claims the priority to the Chinese Patent Application NO. 202010462755.9, entitled "SCROLL-TYPE DISPLAY PANEL AND SCROLL-TYPE DISPLAY DEVICE", filed on May 27, 2020, the entire contents of which are hereby incorporated by reference as a part of the present application.

TECHNICAL FIELD

The present disclosure relates to the field of display technologies, and in particular, to a scroll-type display panel and a scroll-type display device.

BACKGROUND

Scroll-type display panels include scrolls and display modules, and the display modules not only can be wound on the scrolls, but also can be unwound along the scrolls.

It should be noted that the information disclosed in the Background section above is only for enhancing the understanding of the background of the present disclosure, and thus may include information that does not constitute prior art known to those of ordinary skill in the art.

SUMMARY

According to an aspect of the present disclosure, there is provided a scroll-type display panel, including: a display module, wherein the display module includes: a support layer and an array substrate. The support layer includes a first wound portion and a second wound portion distributed along a winding direction, the array substrate is located on a side of the support layer, and an orthographic projection of the array substrate on the support layer is located on the first wound portion. Each of the first wound portion and the second wound portion is provided with a hollowed-out opening, and an area ratio of the hollowed-out opening to the first wound portion is larger than an area ratio of the hollowed-out opening to the second wound portion.

According to an aspect of the present disclosure, there is provided a scroll-type display device including the above-mentioned scroll-type display panel.

It should be noted that the above general description and the following detailed description are merely exemplary and explanatory and should not be construed as limiting of the disclosure.

BRIEF DESCRIPTION OF THE DRAWINGS

The drawings here are incorporated into the disclosure and constitute a part of the disclosure, show embodiments in accordance with the present disclosure, and are used together with the disclosure to explain the principle of the present disclosure. Obviously, the drawings in the following description are only some embodiments of the present disclosure. For those of ordinary skill in the art, other drawings can be obtained based on these drawings without creative work.

DETAILED DESCRIPTION

Figure 1:
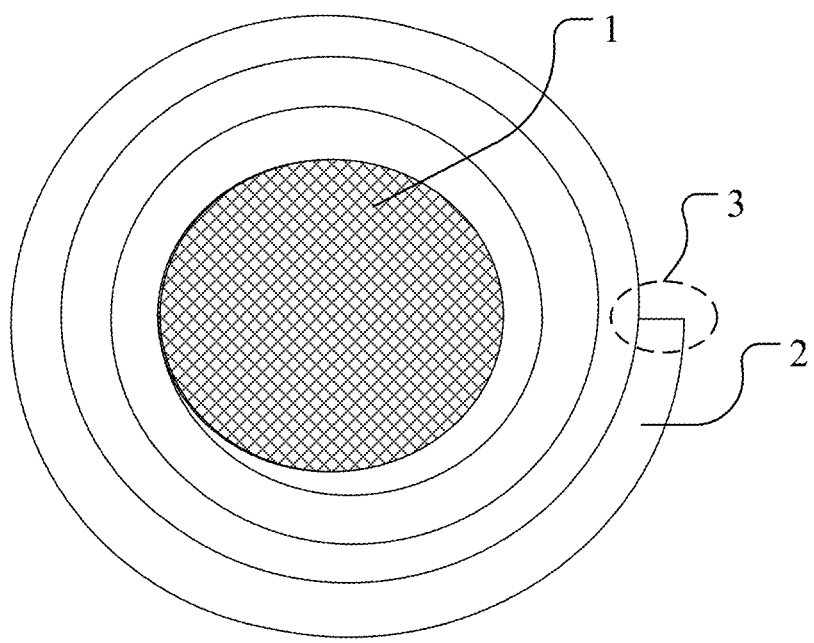
FIG. 1 is a schematic structural diagram of a scroll-type display panel in the related art.

Embodiments will now be described more fully with reference to the accompanying drawings. However, the embodiments can be implemented in a variety of forms and should not be construed as being limited to the examples set forth herein; rather, these embodiments are provided so that the present disclosure will be more full and complete so as to convey the idea of the embodiments to those skilled in this art. The same reference numerals in the drawings denote the same or similar structures, and the repeated description thereof will be omitted.

Although the relative terms such as "above" and "below" are used in the specification to describe the relative relationship of one component to another component shown, these terms are only for convenience in this specification, for example, according to an exemplary direction shown in the drawings. It will be understood that if the device shown is flipped upside down, the component described "above" will become the component "below". Other relative terms, such as "high", "low", "top", "bottom", "left", "right", etc., also have similar meanings. When a structure is "on" another structure, it may mean that a structure is integrally formed on another structure, or that a structure is "directly" disposed on another structure, or that a structure is "indirectly" disposed on another structure through other structures.

The terms "one", "a", and "said" are used to indicate that there are one or more elements/components or the like; and the terms "include" and "have" are used to indicate an open meaning of including and means that there may be additional elements/components/etc. in addition to the listed elements/components/etc.

Figure 2:
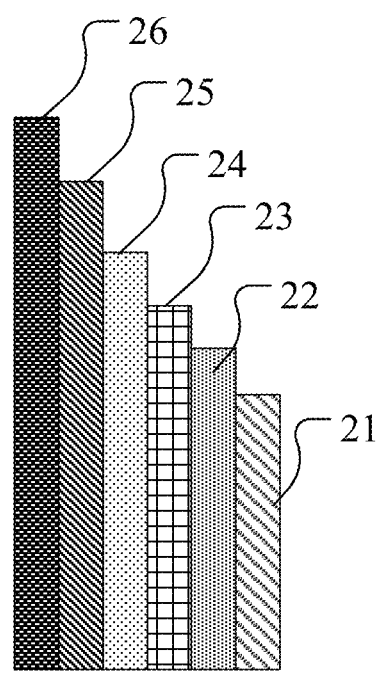
FIG. 2 is a schematic structural diagram of a layer structure of a display module in an ellipse dashed frame 3 in FIG. 1.

As shown in FIGS. 1 and 2, FIG. 1 is a schematic structural diagram of a scroll-type display panel in the related art, and FIG. 2 is a schematic structural diagram of a layer structure of a display module in an ellipse dashed frame 3 in FIG. 1. As shown in FIG. 1, the scroll-type display panel may include a scroll 1 and a display module 2 that can be wound on the scroll 1. As shown in FIG. 2, the display module 2 may include a support layer 21, a first optical adhesive layer 22, a bottom film 23, an array substrate 24, a second optical adhesive layer 25 and a cover plate 26 that are stacked in sequence. When the display module 2 is wound on the scroll 1, an extension path of a structural layer on a side of the display module 2 away from the scroll is larger than an extension path of a structural layer on a side of the display module 2 close to the scroll, therefore layer staggering occurs between respective structural layers in the display module. For example, as shown in FIG. 2, when the display module 2 is wound, the cover plate 26 is a structural layer closest to the scroll. At the end of the winding (i.e., a position shown by the ellipse dashed frame 3), the support layer 21 on the side of the display module 2 away from the scroll 1 and the first optical adhesive layer 22 on the side of the display module 2 relatively close to the scroll 1 are staggered, and the first optical adhesive layer 22 on the side of the display module 2 away from the scroll 1 and the bottom film 23 on the side of the display module 2 relatively close to the scroll 1 are staggered. As a result, when the display module 2 is wound, shearing stresses may be generated between respective structural layers of the display module 2. In the related art, the shearing stresses generated between respective structural layers of the display module 2 due to the layer staggering are mainly absorbed by the optical adhesive layers. For example, the first optical adhesive layer 22 in FIG. 2 can absorb the shearing stress between the support layer 21 and the bottom film 2, and the second optical adhesive layer 25 can absorb the shearing stress between the array substrate 24 and the cover plate 26. However, a capability of the optical adhesive layer to absorb the shearing stress is limited, and when the accumulated shearing stress generated by winding the display module is greater than the maximum value of the shearing stress that the optical adhesive layer can absorb, the display module may experience interlayer fall-off.

Figure 3:
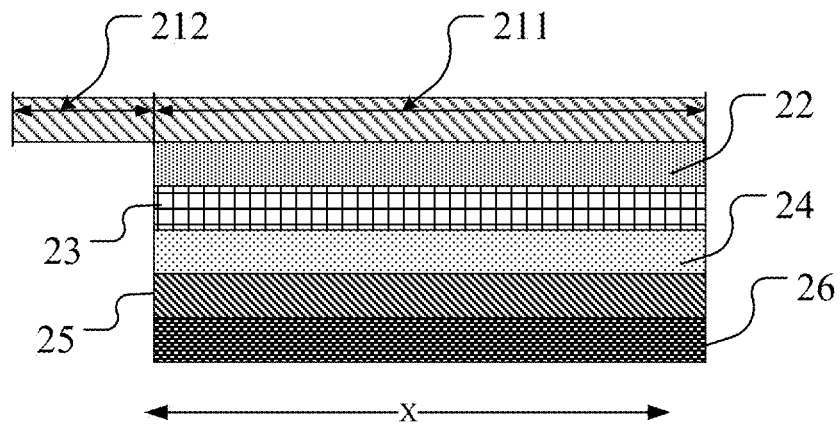
FIG. 3 is a schematic structural diagram of a display module in the related art.

As shown in FIG. 3, which is a schematic structural diagram of a display module in the related art, the support layer of the display module may include a first wound portion 211 and a second wound portion 212 distributed along a winding direction X, and the first optical adhesive layer 22, the bottom film 23, the array substrate 24, the second optical adhesive layer 25, and the cover plate 26 are stacked on the support layer in sequence. Orthographic projections of the first optical adhesive layer 22, the bottom film 23, the array substrate 24, the second optical adhesive layer 25 and the cover plate 26 on the support layer are all located on the first wound portion 211. The display module can be fixedly coupled to the scroll through the second wound portion 212. In the related art, an hollowed-out opening is typically disposed on the support layer 21 to reduce the shearing stress between the support layer 21 and the bottom film 23 in the display module. However, when the scroll-type display panel is stretched or wound, a stretching force along the winding direction X acted on the second wound portion 212 may be generated, and the second wound portion 212 is prone to breakage under the action of the stretching force.

Figure 4:
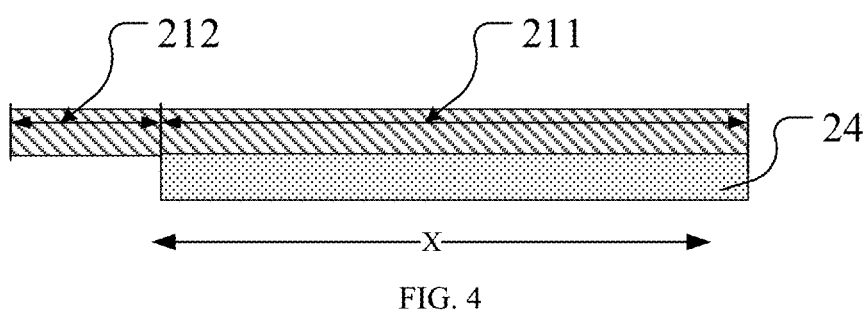
FIG. 4 is a schematic structural diagram of a display module according to an embodiment of a scroll-type display panel in the present disclosure.

Accordingly, the embodiments of the present disclosure provide a scroll-type display panel. As shown in FIG. 4, which is a schematic structural diagram of a display module according to an embodiment of a scroll-type display panel in the present disclosure, the scroll-type display panel includes a display module, and the display module includes a support layer and an array substrate 24. The support layer includes a first wound portion 211 and a second wound portion 212 distributed along the winding direction X, the array substrate 24 is located on a side of the support layer, and an orthographic projection of the array substrate 24 on the support layer is located on the first wound portion 211. Each of the first wound portion 211 and the second wound portion 212 is provided with a hollowed-out opening, and an area ratio of the hollowed-out opening to the first wound portion 211 (that is, a ratio of an area of the hollowed-out opening on the first wound portion to an area of the entire first wound portion) is greater than an area ratio of the hollowed-out opening to the second wound portion 212 (that is, a ratio of an area of the hollowed-out opening on the second wound portion to an area of the entire second wound portion). The support layer may be formed of a metal material.

In the embodiments of the present disclosure, since the area ratio of the hollowed-out openings to the first wound portion 211 is greater than the area ratio of the hollowed-out openings to the second wound portion 212, the first wound portion 211 has a better bending capability, and the second wound portion 212 has a better anti-stretching capability. On the one hand, the second wound portion of the scroll-type display panel can withstand a large stretching force, so as to prevent the second wound portion from breaking during the stretching or winding of the display module; on the other hand, the first wound portion of the scroll-type display panel has a strong bending capability, which can reduce the shearing stress between the support layer and the array substrate generated due to the layer staggering.

Figure 5:
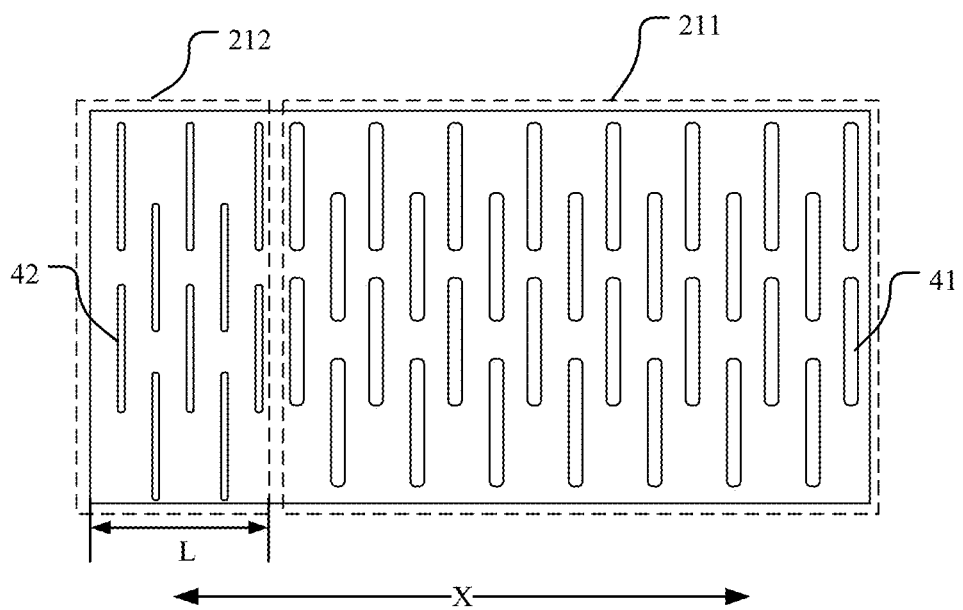
FIG. 5 is a schematic structural diagram of a support layer according to an embodiment of a scroll-type display panel in the present disclosure.

In the embodiments of the present disclosure, as shown in FIG. 5, which is a schematic structural diagram of a support layer according to an embodiment of a scroll-type display panel in the present disclosure, the first wound portion 211 may be provided with a plurality of first hollowed-out openings 41, and the second wound portion 212 may be provided with a plurality of second hollowed-out openings 42. In the embodiments of the present disclosure, the first hollowed-out opening 41 may be a rounded rectangle, a width direction of the first hollowed-out opening 41 may be the same as the winding direction X, and adjacent two first hollowed-out openings in the width direction of the first hollowed-out opening 41 are staggered in a length direction of the first hollowed-out opening. In the embodiments of the present disclosure, the second hollowed-out opening 42 may also be the rounded rectangle, a width direction of the second hollowed-out opening 42 may be the same as the winding direction X, and adjacent two second hollowed-out openings 42 in the width direction of the second hollowed-out opening 42 are staggered in a length direction of the second hollowed-out opening.

In the embodiments of the present disclosure, as shown in FIG. 5, a width of the first hollowed-out opening 41 may be greater than a width of the second hollowed-out opening 42, and a length of the first hollowed-out opening 41 may be equal to a length of the second hollowed-out opening 42. In the winding direction X of the first wound portion and the second wound portion, a distance between adjacent first hollowed-out openings 41 can be equal to a distance between adjacent second hollowed-out openings 42.

It should be understood that, in other embodiments, the hollowed-out openings on the first wound portion and the second wound portion may also have other shapes, for example, the first hollowed-out opening and the second hollowed-out opening may be rectangular, circular, triangular and the like, and shapes and sizes of the first hollowed-out opening and the second hollowed-out opening may be the same or different.

Figure 6:
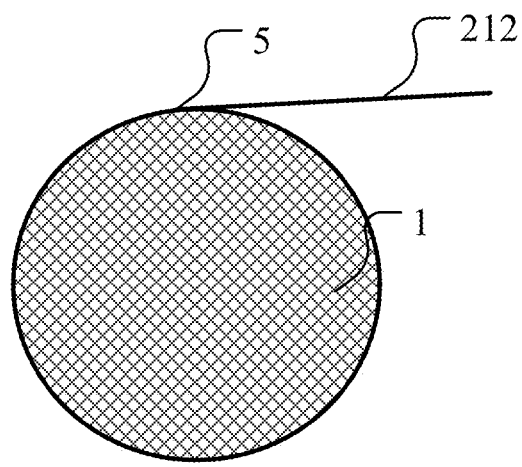
FIG. 6 is a schematic structural diagram of a scroll-type display panel according to an embodiment of the present disclosure.

In the embodiments of the present disclosure, as shown in FIG. 6, which is a schematic structural diagram of a scroll-type display panel according to an embodiment of the present disclosure, the scroll-type display panel may further include a scroll 1, and the second wound portion 212 may fixed on the scroll 1. As shown in FIG. 6, when the display module is wound on the scroll 1, the second wound portion 212 is first wound on the scroll 1, and then the first wound portion is wound on the scroll 1. The second wound portion 212 can bear a partial shearing stress between the first wound portion and the array substrate, thereby preventing the first wound portion from falling off the array substrate. As shown in FIG. 6, there is a height difference along a radial direction of the scroll at a junction position 5 of a first turn and a second turn in the display module, and accordingly, when the display module is wound, the position 5 of the display module is subject to the maximum stretching force. As shown in FIGS. 5 and 6, in the embodiments of the present disclosure, an outer diameter of the scroll 1 may be D, and a length L of the second wound portion along the winding direction X may be greater than πD. This arrangement is such that when the display module is wound, the junction position 5 of the first turn and the second turn is located on the second wound portion 212, thereby reducing the risk of breakage of the display module.

Figure 7:
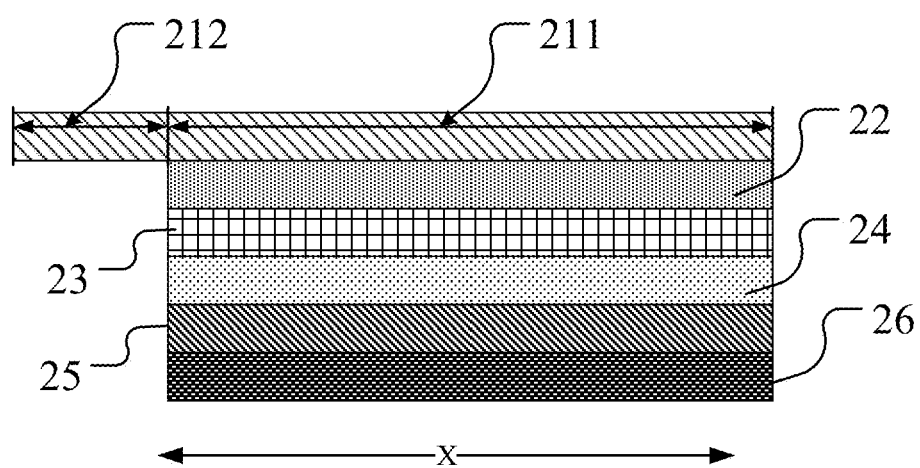
FIG. 7 is a schematic structural diagram of a display module according to another embodiment of a scroll-type display panel in the present disclosure.

In the embodiments of the present disclosure, as shown in FIG. 7, which is a schematic structural diagram of a display module according to another embodiment of a scroll-type display panel in the present disclosure, the scroll-type display panel may further include: a first optical adhesive layer 22 and a bottom film 23. The first optical adhesive layer 22 is disposed between the support layer 21 and the array substrate 24, and an orthographic projection of the first optical adhesive layer 22 on the support layer 21 is located on the first wound portion. The bottom film 23 is disposed between the first optical adhesive layer and the array substrate, and an orthographic projection of the bottom film 23 on the support layer is located on the first wound portion. The bottom film 23 may be formed of a PET material.

In the embodiments of the present disclosure, as shown in FIG. 7, the scroll-type display panel may further include: a second optical adhesive layer 25 and a cover plate 26. The second optical adhesive layer 25 may be disposed on a side of the array substrate away from the support layer, and an orthographic projection of the second optical adhesive layer 25 on the support layer is located on the first wound portion. The cover plate 26 can be disposed on a side of the second optical adhesive layer away from the array substrate, and an orthographic projection of the cover plate on the support layer is located on the first wound portion. The cover plate 26 may be a glass cover plate.

The embodiments of the present disclosure also provide a scroll-type display device including the above-mentioned scroll-type display panel.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A scroll-type display panel, comprising a display module, wherein the display module comprises:
   a support layer, comprising a first wound portion and a second wound portion distributed along a winding direction; and
   an array substrate, located on a side of the support layer, wherein an orthographic projection of the array substrate on the support layer is located on the first wound portion;
   wherein each of the first wound portion and the second wound portion is provided with at least one hollowed-out opening, and an area ratio of the at least one hollowed-out opening on the first wound portion to the first wound portion is larger than an area ratio of the at least one hollowed-out opening on the second wound portion to the second wound portion.

2. The scroll-type display panel according to claim 1, wherein the scroll-type display panel further comprises:
   a scroll, wherein the second wound portion is fixed on the scroll.

3. The scroll-type display panel according to claim 2, wherein an outer diameter of the scroll is D, and a length of the second wound portion along the winding direction is greater than πD.

4. The scroll-type display panel according to claim 1, wherein:
   the at least one hollowed-out opening on the first wound portion comprises a plurality of first hollowed-out openings; and
   the at least one hollowed-out opening on the second wound portion comprises a plurality of second hollowed-out openings.

5. The scroll-type display panel according to claim 4, wherein each first hollowed-out opening is a rounded rectangle, a width direction of the first hollowed-out opening is the same as the winding direction, and adjacent two first hollowed-out openings in the width direction of the first hollowed-out opening are staggered in a length direction of the first hollowed-out opening.

6. The scroll-type display panel according to claim 5, wherein each second hollowed-out opening is a rounded rectangle, a width direction of the second hollowed-out opening is the same as the winding direction, and adjacent two second hollowed-out openings in the width direction of the second hollowed-out opening are staggered in a length direction of the second hollowed-out opening.

7. The scroll-type display panel according to claim 6, wherein a width of the first hollowed-out opening is greater than a width of the second hollowed-out opening, a length of the first hollowed-out opening is equal to a length of the second hollowed-out opening, and in the winding direction of the first wound portion and the second wound portion, a distance between adjacent two first hollowed-out openings is equal to a distance between adjacent two second hollowed-out openings.

8. The scroll-type display panel according to claim 1, wherein the display module further comprises:
   a first optical adhesive layer, disposed between the support layer and the array substrate, wherein an orthographic projection of the first optical adhesive layer on the support layer is located on the first wound portion; and
   a bottom film, disposed between the first optical adhesive layer and the array substrate, wherein an orthographic projection of the bottom film on the support layer is located on the first wound portion.

9. The scroll-type display panel according to claim 1, wherein the display module further comprises:
   a first optical adhesive layer, disposed on a side of the array substrate away from the support layer, wherein an orthographic projection of the first optical adhesive layer on the support layer is located on the first wound portion; and a cover plate, disposed on a side of the first optical adhesive layer away from the array substrate, wherein an orthographic projection of the cover plate on the support layer is located on the first wound portion.

10. A scroll-type display device, comprising a scroll-type display panel, wherein the scroll-type display panel comprises a display module, and wherein the display module comprises:

a support layer, comprising a first wound portion and a second wound portion distributed along a winding direction; and an array substrate, located on a side of the support layer, wherein an orthographic projection of the array substrate on the support layer is located on the first wound portion;

wherein each of the first wound portion and the second wound portion is provided with at least one hollowed-out opening, and an area ratio of the at least one hollowed-out opening on the first wound portion to the first wound portion is larger than an area ratio of the at least one hollowed-out opening on the second wound portion to the second wound portion.

11. The scroll-type display device according to claim 10, wherein the scroll-type display panel further comprises:

a scroll, wherein the second wound portion is fixed on the scroll.

12. The scroll-type display device according to claim 11, wherein an outer diameter of the scroll is D, and a length of the second wound portion along the winding direction is greater than πD.

13. The scroll-type display device according to claim 10, wherein:

the at least one hollowed-out opening on the first wound portion comprises a plurality of first hollowed-out openings; and the at least one hollowed-out opening on the second wound portion comprises a plurality of second hollowed-out openings.

14. The scroll-type display device according to claim 13, wherein each first hollowed-out opening is a rounded rectangle, a width direction of the first hollowed-out opening is the same as the winding direction, and adjacent two first hollowed-out openings in the width direction of the first hollowed-out opening are staggered in a length direction of the first hollowed-out opening.

15. The scroll-type display device according to claim 14, wherein each second hollowed-out opening is a rounded rectangle, a width direction of the second hollowed-out opening is the same as the winding direction, and adjacent two second hollowed-out openings in the width direction of the second hollowed-out opening are staggered in a length direction of the second hollowed-out opening.

16. The scroll-type display device according to claim 15, wherein a width of the first hollowed-out opening is greater than a width of the second hollowed-out opening, a length of the first hollowed-out opening is equal to a length of the second hollowed-out opening, and in the winding direction of the first wound portion and the second wound portion, a distance between adjacent two first hollowed-out openings is equal to a distance between adjacent two second hollowed-out openings.

17. The scroll-type display device according to claim 10, wherein the display module further comprises:

a first optical adhesive layer, disposed between the support layer and the array substrate, wherein an orthographic projection of the first optical adhesive layer on the support layer is located on the first wound portion; and a bottom film, disposed between the first optical adhesive layer and the array substrate, wherein an orthographic projection of the bottom film on the support layer is located on the first wound portion.

18. The scroll-type display device according to claim 10, wherein the display module further comprises:

a first optical adhesive layer, disposed on a side of the array substrate away from the support layer, wherein an orthographic projection of the first optical adhesive layer on the support layer is located on the first wound portion; and a cover plate, disposed on a side of the first optical adhesive layer away from the array substrate, wherein an orthographic projection of the cover plate on the support layer is located on the first wound portion.

* * * * *